United States Patent [19]

Koelliker et al.

[11] Patent Number: 5,959,029
[45] Date of Patent: Sep. 28, 1999

[54] COMPOSITION CONTAINING A STYRENE/ METHACRYLATE POLYMER

[75] Inventors: Robert Koelliker, Nottwil; Harald Bachler, Buchs, both of Switzerland

[73] Assignee: National Starch and Chemical Investment Holding Corporation, Wilmington, Del.

[21] Appl. No.: 08/912,801

[22] Filed: Aug. 18, 1997

Related U.S. Application Data

[63] Continuation of application No. 08/447,165, May 19, 1995, abandoned.

[30] Foreign Application Priority Data

Jan. 26, 1995 [DE] Germany .......................... 195 02 435

[51] Int. Cl.⁶ .................................................. C08G 63/48
[52] U.S. Cl. ............................ 525/57; 523/201; 523/402; 523/406; 523/411; 523/412; 523/400; 523/437; 524/458; 524/459; 524/503; 524/516; 524/517; 525/205; 525/208
[58] Field of Search ..................................... 523/201, 402, 523/406, 411, 412, 400, 437; 524/459, 458, 503, 516, 517; 525/57, 205, 208

[56] References Cited

U.S. PATENT DOCUMENTS

| | | | |
|---|---|---|---|
| 2,773,050 | 12/1956 | Caldwell et al. | 260/45.5 |
| 3,051,668 | 8/1962 | Bauer et al. | 260/17 |
| 3,758,635 | 9/1973 | Labana et al. | 523/437 |
| 3,959,205 | 5/1976 | Kobayashi et al. | 524/459 |
| 3,959,405 | 5/1976 | Labana et al. | 525/205 X |
| 3,970,725 | 7/1976 | Tugukuni et al. | 525/208 |
| 3,991,132 | 11/1976 | Siwiec et al. | 525/208 X |
| 4,009,131 | 2/1977 | Farone | 523/437 |
| 4,092,373 | 5/1978 | Siwiec et al. | 525/207 X |
| 4,374,954 | 2/1983 | Labana et al. | 525/207 |
| 4,397,968 | 8/1983 | Eck et al. | 523/305 |
| 4,539,362 | 9/1985 | Davies et al. | 524/459 X |
| 4,616,058 | 10/1986 | Yubuta et al. | 524/461 |
| 4,670,505 | 6/1987 | Craig | 524/704 |
| 4,774,291 | 9/1988 | Maeda | 525/207 X |
| 4,816,501 | 3/1989 | Nomura et al. | 523/406 |
| 5,244,737 | 9/1993 | Anderson et al. | 524/459 X |
| 5,354,800 | 10/1994 | Suzuki et al. | 524/458 X |
| 5,360,860 | 11/1994 | Itoh et al. | 524/458 X |
| 5,362,803 | 11/1994 | LaFleur et al. | 525/57 |
| 5,405,879 | 4/1995 | Uemae et al. | 524/458 X |

FOREIGN PATENT DOCUMENTS

| | | | |
|---|---|---|---|
| 0 538 571 A1 | 10/1991 | European Pat. Off. . | |
| 0 538 571 A1 | 8/1992 | European Pat. Off. | C08F 2/30 |
| 1144152 | 5/1966 | Germany | C08F 1/13 |
| 2451772 | 5/1976 | Germany | 524/459 |
| 0 346 728 | 6/1988 | Germany . | |
| 54-132006 | 10/1979 | Japan . | |
| 57-46130 | 3/1982 | Japan . | |
| 0162611 | 9/1983 | Japan | 524/459 |
| 61-305656 | 12/1986 | Japan . | |
| 63-168333 | 7/1988 | Japan . | |
| 3-354135 | 11/1991 | Japan . | |
| 6-19057 | 3/1994 | Japan | C09D 5/00 |

*Primary Examiner*—Judy M. Reddick
*Attorney, Agent, or Firm*—Ellen T Dec

[57] ABSTRACT

The invention relates to a chemical composition containing a) a copolymer based on styrene and/or at least one alkyl (meth)acrylate, the quantity of styrene and/or alkyl (meth) acrylate being $\geq 50\%$ by weight, based on the total monomers, and at least one further comonomer, and b) a water-soluble polymeric protective colloid, wherein about 2 to 30 parts per weight of the water-soluble polymeric protective colloid are allotted to 100 parts by weight of the copolymer, and c) optional further additives as required. The copolymer contains appoximately 0.1 to 50% by weight units of an epoxide-group-containing ethylenically unsaturated comonomer. Such units show reactive epoxide groups. The invention relates further to an aqueous polymer dispersion of said chemical composition, the production of same and a special method for obtaining the chemical composition from the polymer dispersion and special applications of the aqueous polymer dispersion and the chemical composition.

9 Claims, No Drawings

COMPOSITION CONTAINING A STYRENE/METHACRYLATE POLYMER

This application is a continuation of application Ser. No. 08/447,165, filed May 19, 1995, now abandoned.

The invention relates to a chemical composition containing a) a copolymer based on styrene and/or at least one aklyl (meth)acrylate, the amount of styrene and/or alkyl (meth)acrylate being $\geq 50\%$ by weight, based on the total monomers, as well as at least one further comonomer, and b) a water-soluble polymer protective colloid, wherein about 2 to 30 parts by weight of the water-soluble polymer protective colloid are allotted to 100 parts by weight of the copolymer, as well as c) optional further additives. The invention further relates to an aqueous polymer dispersion of said chemical composition, the production of same and a method for obtaining the chemcial composition from the polymer dispersion and also special uses of the aqueous polymer dispersion and the chemical composition.

Prior art of the above described nature results e.g. from EP 0 538 571 A (Applicant: H ls AG). Such application discloses a method for producing protective-colloid-stabilized emulsifier-free, aqueous plastic dispersions on the basis of>50% by weight of styrene and/or $C_1$–$C_8$-alkyl (meth)acrylate, on the basis of the total monomers, by semi-continuous polymerization of the monomers, in aqueous phase as dispersion medium in presence of a water-soluble polyvinyl alcohol as protective colloid, and a radical initiator, or of an initiator system consisting of a radical initiator and an aqueous reduction agent. The ploymerization is carried out in a monomer addition operation, the total polyvinyl alcohol quantity being taken into the receiver. The requirement of this prior art, i.e. to work without emulsifier, is to avoid problems otherwise appearing with the use of protective-colloid-stabilized plastic dispersions. So, emulsifiers are considered to be undesirable because they have e.g. a negative influence on the film formation. As advantageous is mentioned, that according to such teaching, the aqueous polymer dispersion has a comparatively low residual monomer contents of less than 10 ppm. The method according to EP 0 538 571 A1 is little flexible because, apart from the requirement of the absence of an emulsifier, it is subject to a large number of strong limitations. So e.g. must be proceeded strongly semi-continuously. It is also disadvantageous that a special protective colloid in the form of water-soluble polyvinyl alcohol is mandatorily to be employed. The same holds true for polyethylene oxide which likewise mandatorily must be used in the method according to EP 0 538 572 A1. Although this leads to an advantageous process sequence and also to the desired redispersibility of the substance obtained from the aqueous plastic dispersion, it may, however, have a disadvantageous influence during later cases of application of the plastic dispersion or the composition obtainable therefrom. In single cases it is also desirable to replace the polyvinyl alcohol by other suitable polymeric protective colloids on account of its relatively high price.

Also prior art according to EP 0 062 106 B1 (Patent Holder: Wacker-Chemie GmbH) is relevant. There a method for producing aqueous dispersions on the basis of polymers is described which consist of at least 60% by weight of (meth)acrylic ester units and/or styrene units, and the solid contents of which amounts to approximately 30 to 70% by weight. The method is carried out in a way that 4 to 20% by weight polyvinyl alcohol, based upon the monomers, are present in the aqueous dispersion during production. Further, the total weight of the monomer concentration is kept below 20% by weight during the total duration of the reaction, and the bulk of the monomers is dosed-in during the reaction in the form of a preemulsion. Also that method shows a lack of flexibility, as mentioned above with reference to EP 0 538 571 A1. Moreover it must be judged to be disadvantageous that a preemulsion must be formed in a technically complicated manner. Also the residual monomer contents of the obtained aqueous dispersion amounts to approximately 500 ppm which is bad with respect to the above described prior art according to EP 0 538 571. A high residual monomer contents has a disadvantageous effect seen under a variety of points of view. So, e.g., the monomer will evaporate during a later application which is hazardous, in particular under considerations of toxicity. It would be, therefore, advantageous to keep the residual monomer contents as low as possible.

It is the object of the invention to develop the chemical compositions produced in accordance with the above described methods, so that same, on the one hand, at least preserve their advantageous properites of said known products or in special cases even exhibit improved properties, the production of which, however, with a view to process regime and the selection of starting materials, in particular the water-soluble protective colloid, may be made more flexible. Additionally, those chemical compositions should be improved so that they would produce in their final applications, such as in plastic-containing, cement-bonded systems, improved application products on the basis of desired sequential reactions. Such general object includes also an improved method for producing such chemical composition and more advantageous application possibilities such as e.g. the improvement of the adhesive pull strength of certain materials, such as tile adhesives.

The above object is obtained according to the invention by using a chemical composition of the initially described nature which is characterized in that the copolymer contains approximately 0.1 to 50% by weight units of an epoxide-group-containing, ethylenically unsaturated comonomer and that such units contain reactive epoxide groups.

The composition according to the invention contains therefore a copolymer based on styrene and/or at least one alkyl (meth)acrylate and at least one further comonomer. Said at least one further comonomer is an epoxide-group-containing ethylenically unsaturated comonomer which may be an ester or an ether. Such ester is preferably an alkene oxide methacrylate, in particular a glycidyl (meth)acrylate, and the ether is an alkene oxide vinyl ether or allyl ether, in particular a glycidyl vinyl ether and/or a glycidyl allyl ether.

For obtaining the above objective it is most important that the reactive epoxide groups of said polymerized-in comonomer are largely preserved during the polymerization process. So the epoxide functionality of the comonomer polymerized into the copolymer amounts preferably to at least about 30%, in particular to approximately 60%, or even 90% and more.

The quantity of such comonomer within the described copolymer based on styrene and/or at least one alkyl (meth)acrylate amounts to, as said above, approximately 0.1 to 50% by weight. Preferably a range of approximately 1 to 25% by weight, in particular approximately 2 to 20% by weight, is adjusted.

The styrene and/or alkyl (meth)acrylate quantity within the copolymer amounts to at least 50% by weight, preferably 70 to 80% by weight, based on the total monomers. The skilled artisan is conscious of the fact that he may use also substituted styrene compounds, in particular such as modified with alkyl sulfonyl and carboxyl groups instead of styrene compounds. The term "alkyl (meth)acrylatell" is to comprise also mixtures of acrylates and methacrylates or also mixtures of various alkylacrylates and methacrylates. In this context also the feature of "alkyl group" is to be understood to contain straight, branched chain and cyclic alkyl groups. Among the cylcic groups are to be mentioned e.g. cyclohexyl, phenyl, alkylphenyl, isobornyl, furfuryl, tetrahydrofurfuryl or dicylopentyl groups. Preferred are, howewer, straight and branched chain alkyl groups, in particular having a chain length of 1 to 18 carbon atoms, preferably 1 to 8 carbon atoms. Among such alkyl (meth) acrylates are to be mentioned in particular methyl (meth) acrylate, ethyl (meth)acrylate, butyl (meth)acrylate and/or 2-ethyl-hexyl (meth)acrylate.

In particular cases it may be advantageous, for modifying the properties of the chemical composition in accordance with the invention, facultatively to polymerize-in yet further comonomers, in addition to the above mentioned mandatorily required comonomers. As preferred examples there may be mentioned in this context: (meth)acrylic acid, (meth)acryl amide and derivatives thereof, such as N,N-dialkyl (meth) acrylamide, N-methylol (meth)acrylamide and (meth) acrylnitrile, at the alkyl chain functionalized akryl(meth) acrylates, in particular hydroxy alkyl (meth)acrylates, such as hydroxy ethyl (meth)acrylate, oligoand polyethylene glycol (meth)acrylate, aminoalkyl(meth)acrylate and N,N derivatives thereof, trialkylammonium alkyl(meth)acrylates, itaconic acid, maleic acid and fumaric acid and esters thereof, amides, functionalized amides and nitriles. So is it e.g. possible to control the hydrophilicity of the chemical compositions using some of such comonomers. A high hydrophylicity results in an improvement of the redispersibility under standard conditions.

Also crosslinking monomers containing two or more polymerizable double bonds may be employed. As examples may be mentioned: divinyl benzene, diallylphthalate, triallylcyanurate, ethlylene glycol di(meth)acrylate, butanediol di(meth)acrylate, hexanediol di(meth)acrylate, diethylene glycol di(meth)acrylate, allyl (meth)acrylate, with divinyl benzene, ethylene glycol di(meth)acrylate and allyl (meth)acrylate being preferred.

An essential constituent of the chemical composition is also the polymeric protective colloid. That is, on the one hand, essential for the production of the aqueous polymer dispersion, on the other hand also at least co-responsible for the desired redispersibility of the chemical composition in aqueous systems. The polymer protective colloid must therfore be water-soluble in the first place. The water-solubility is effected by the more or less polar groups which are present within the polymeric protective colloid. It is possible to explain their function during the production of the chemical composition and as regards the above mentioned redispersibility e.g. in a manner as results from the doctor's thesis by K. Bruger: "Zum Einfluß des Polymerisationsgrades teilverseifter Polyvinyl-acetate auf die stabilitat der Suspensionspolymerisierung von Styrol" (Contribution to the Influence of the Degree of Polymerization of Partly Saponified Polyvinylacetates on the Stability of Suspension Polymerization of Styrene), TU Munich, Germany, 1993, pages 12/13. Although this thesis treats the suspension polymerization, the effects may be transferred to the emulsion polymerization as well without problems, since the polymerization polymerisates differ primarily in the particle size and the protective colloid portion only. Thereby could be assumed that the protective colloid is adsorbed at the monomer surface, effecting thus a steric stabilization.

The present invention is substantially unrestriced as regards the selection of the water-soluble polymeric protective colloid. So e.g., the following protective colloids may be used: polyethylene oxide (cf. EP 538 572), starch and starch derivatives (cf. EP 131 899 and literature there mentioned), gelatin, casein and other water-soluble proteins (cf. EP 134 450 and literature there mentioned), water-soluble cellulose derivatives such as hydroxyethyl cellulose (cf. EP 99 463), polysaccharides (cf. JP 1-131447), water-soluble polyacrylates, such as acrylic acid copolymerizates, ethylene oxide-propylene oxide copolymers, functionalized polyvinyl alcohol, such as acetoacetalized polyvinyl alcohol (cf. JP 6-19057), polyvinyl alcohol and/or polyvinyl pyrrolidone. Polyvinyl alcohol and/or polyacrylates and/or polyvinyl pyrrolidone are preferred as water-soluble protective colloid. The polyvinyl aclohol has preferably a medium molecular weight of approximately 10,000 to 250,000, in particular approximately 20,000 to 200,000, and a hydrolysis degree of about 80 to 95%, in particular approximately 83 to 92%. The polyvinyl pyrrolidone is preferably characterized by a medium molecular weight of 1,000 to 1,000,000, in particular 7,000 to 700,000.

As already stated, the components a) and b) in the present invention must obey the quantitative general condition, according to which approximately 2 to 30 parts by weight of water-soluble polymeric protective colloid b), in particular approximately 5 to 15 parts by weight, are to be allotted to each 100 parts by weight of compolymer a).

For controlling the properties of the chemical composition according to the invention, same may contain, in addition to the components a) and b), optionally still other additives. Such are e.g. additional protective colloids, in particular also in the form of a water-soluble polymeric protective colloid which may be equal to or also different from the already discussed component b). Furthermore the following additives may be added: plasticizers, film-forming aids, preservation agents, emulsifiers, wetting agents, defoamers, thickening agents, rheology modification agents, crosslinking agents, resins, adhesive adjuvants, fillers, antiblocking agents and pigments.

Since the chemical composition according to the invention is preferably formed by emulsion polymerization, in its production advantageously also various emulsifiers may be used which are also effective for redispersion. Such emulsifiers may be nonionic emulsifiers such as e.g. alkyl phenol EO 10 or EO 50 (EO=degree of ethoxylation), in particular nonyl phenol EO 10 or EO 50, alkyl alcohol EO 15 or 25, in particular C13-alcohol EO 15 or 25, sorbitan fatty acid ester, ethoxylated fatty acid esters, glycerin fatty acid esters, ethoxylated alkylamnnes, anoinic emulsifiers such as in particular ammonium, sodium or calcium salts of various fatty acids, alkylaryl sulfonic acids, alkyl sulfonates, alkyl ether sulfates, alykyl sulfate esters, alkyl sulfonates, ethoxylated alkyl ether sulfonates, ethoxylated alkylallyl ether sulfonic acid esters, alkylphenol ether sulfates, dialkylsulfosuccinates, kationic emulsifiers such as in particular alkylammonium acetate or quaternary ammonium and pyridinium compounds, amphoteric emulsifiers such as alkylbetaines, copolymerizable emulsifiers such as sodium dodecyl allyl sulfosuccinate. Also mixtures of emulsifiers may be used.

The chemical composition according to the invention may be obtained from an aqueous polymer dispersion which is made by means of the method as described in further details hereinafter. Utilizable methods for separating the aqueous medium are filtration, centrifuging and/or drying methods, in particular spray drying. In case of the preferred spray drying, there is produced a pulverulent product which may later advantageously be used. If solid compact compositions are formed when separating the aqueous medium, it may advantageously be envisaged to grind them first by usual grinding procedures.

Object of the present invention is also a method for producing protective-colloid-stabilized dispersions of a chemical composition having a contents of a) a copolymer based on styrene and/or at least one alkyl (meth)acrylate, the quantitiy of styrene and/or the alkyl (meth)acrylate being≧50% by weight, based upon the total monomers, and at least one further comonomer, and of b) a water-soluble polymeric protective colloid wherein approximately 2 to 30 parts by weight of water-soluble polymeric protective colloid are allotted to 100 parts by weight of copolymer, and c) optional further additives.

The polymerization of the monomers is carried out in aqueous phase as dispersion medium in presence of a free radical initiator. The qualitative and quantitative general conditions as explained in the context of the chemical composition according to the invention apply, mutatis mutandis, for the method according to the invention, and vice versa, what is to be pointed out here in order to avoid repetitions. So, e.g., the quantity of the used epoxy-group-containing ethylenically unsaturated comonomer must amount to approxmately 0.1 to 50 1% by weight, based upon the total monomers.

The addition of the epoxide-group-containing ethylenically unsaturated comonomer is advantageously carried out in such a way that a core/shell structure appears in the polymer, in which the proportion of this comonomer is bigger in the shell than in the core. Thereby the expensive comonomer may selectively be arranged at the surface of the latex particle. Thereby a substantially higher portion of the epoxide groups participates in a subsequent crosslinking reaction.

It has been found that on expert observation of the general conditions in accordance with the invention, the residual monomer contents is negligible. It even may be less than 150 ppm, it being possible also to totally exclude the residual monomers.

The polymerization is preferably carried out between approximately 50 and 100° C., in particular between approximately 60 and 90° C. In single cases, the initial temperature amounts to preferably approximately 70° C. The heat evolution resulting from the exothermic reaction may be used to reach a reaction temperature between 80 and 90° C., a cooling being possibly required for not to exceed the stated temperature range. It is also possible to remove the total heat evolved, in order to maintain the initial temperature of approximately 70° C. during the reaction or even to reduce it.

In particular cases also an autoclave may be used, which offers the possibility of carrying out the polymerization above 100° C. Thereby the conditions must thus be set that the epoxide functionality of the comonomer, subject matter of the invention, in the final polymer is substantially maintained.

An especially important feature during the process according to the invention is, that the epoxide functionality of the already discussed epoxide-group-containing, ethylenically unsatureated, comonomer is largely conserved. That means that the epoxide groups do not enter a reaction during the process. So, e.g., a too high or too low pH-value may have the effect that the epoxide groups are no longer available after the polymerization due to a chemical reaction. It is therfore advantageous if the pH value in the aqueous emulsion medium is kept at approximately 4 to 10, in particular approximately 5 to 9, preferably 7, during the polymerization. This is effected e.g. by suitable buffer systems such as with sodium bicarbonate. Principally it is possible to use any buffer systems which is suitable for the respective pH value as desired.

In cases in which the protective-colloid-stabilized dispersion is directly used, the addition of water-miscible organic liquids, such as methanol, ethanol and propanol, into the polymerization process has certain advantages, obtaining thus e.g. more waterproof systems.

With respect to the addition of the protective colloid, the method in accordance with the invention is not subject to the restrictions as described above in connection with prior art. So the addition of the protective colloid may be carried out in accordance with prior art according to EP 0 538 571 A1 in adding the total amount of protective colloid into the receiver. It is also possible to add part, e.g. 85%, into the receiver and the rest of 15% within a period of time of approximately 30 minutes. In case of another embodiment e.g. 50% may be added into the receiver and the rest of 50% during the whole period of time of the addition of the monomer. Such portion of the protective colloid as added during the reaction may be dosed-in in the form of an aqueous solution or in the form of a mixture of aqueous solution with part of, or the total quantity of the monomer.

Principally the method according to the invention may be carried out continuously, semi-continuously or as a batch process. Further, the skilled artisan knows that he has to take into consideration the basic principles of an emulsion polymerization for carrying out the method according to the invention. So, as already pointed out, free radical initiators may be used for carrying out the polymerization. The radical initiators are either water-soluble or essentially non-water-soluble, but in such case moromer-soluble. Suitable water-soluble initiators are sodium, potassium and ammonium peroxodisulfate, hydrogen peroxide and water-soluble azo compounds such as 2,2'-azobis(2-amidinopropane) dihydrochloride. Peroxodisulfates are preferred. Suitable monomer-soluble initiators include organic hydroperoxides sich as tert-butyl hydroperoxide, dibutyl peroxide, pinane hydroperoxide, p-menthane hydroperoxide, cumene hydroperoxide and diisopropyl phenyl hydroperoxide, organic peroxides such as dibenzoyl peroxide, dilauryl peroxide and diacetyl peroxide and monomer-soluble azo compounds, such as azoisobutyronitrile. Tert-butyl hydroperoxide is preferred. Also mixtures of initiators may be used.

Instead of a radical initiator also an initiator system consisting of a radical initiator as described above and a water-soluble reduction agent may be used. The water-soluble reduction agents have the effect of activators for the initiators. Suitable reduction agents are ascorbic acid, sodium-, potassium- and ammonium-sulfite, -bisulfite and -metabisulfite, sodium formaldehyde sulfoxylate, tartaric acid, citric acid and glucose. They may be used in combination with a heavy-metal salt. The reduction agents are usually used in a quantity of approximately 0.01 to 2% by weight, based on the total monomers. They are usually dosed during the polymerization The actual free radical initiator is formed during the polymerization which may occur e.g., by thermic disintegration of the above initiator, but also by reaction of the initiator with an aqueous reduction agent. The initiators or initiator combinations are usually used in a quantity of approximately 0.01 to 2% by weight based on the total monomers.

It may also be of advantage if water-soluble viscosity control agents are used during the method in accordance with the invention. The water-soluble viscosity control agents act as radical transfer agents during the grafting of the monomers on the polyvinyl alcohol. Suitable viscosity control agents are low-molecular organic sulfur compounds, such as e.g. thioglycolic acid, and low-molecular non-surface-active amino alcohol compounds, such as e.g. triethanolamine, as well as aldehydes, such as acetaldehyde, halogenated hydrocarbons having 1 to 8 carbon atoms such as methylene chloride. Triethanolamine is preferred. The viscosity control agent as a rule is used in a quantity of approximately 0.01 to 2% by weight, based on the total monomers. A preferred embodiment of the method according to the invention consists in carrying out the polymerization in presence of a peroxodisulfate and a viscosity control agent. The peroxodisulfate may be placed into the receiver or dosed-in during the polymerization obtaining thus redispersible dispersions having a high hydrophilicity.

Polymerization may be carried out in a monomer addition process with the possibility of varying the manner of addition of the protective colloid. The monomers are dosed-in during the polymerization. Part of the monomers may be placed into the receiver. But part of the monomer mixture may also be placed into the receiver and be polymerized in a batch operation thereby producing a seed latex. Polymerization is subsequently carried out in monomer addition process. The viscosity of the dispersion may be controlled a.o. by the period of dosing-in of the monomers. The solid content of the dispersion may amount to between approximately 30 and 70%.

The chemical compositions and the aqueous polymer dispersions in accordance with the present invention may find a variety of uses. So the dispersions according to the invention are suitable for use in plastic-containing, cement-bonded systems, in particular in mortars, cement paints and adhesives, and plastic-bonded, cement-free binders, in particular in gypsum mortars, plasters, carpet, wood and floor adhesives and in wallpaper glues, dispersion paints and glassfiber composite systems.

The chemical compositions in accordance with the present invention are suitable for being used in plastic-comprising, cement-bonded systems, in particular in mortars, cement paints and adhesives, and plastic-bonded, cement-free binders, in particular in gypsum mortars, plasters, carpet, wood, powder and floor adhesives and in wallpaper glues, in dispersion powder paints and in glass fiber composite systems. In a solid form, the chemical composition in accordance with the present invention may be included in pulverulent readymade mixtures to be stirred by the user into water or other liquids prior to being used. It is also feasible that the aqueous dispersion of the chemical composition (obtained by emulsion polymerization or also reconstituted from the solid chemical composition) and a mixture containing the other constituents are delivered in the form of separate components and are combined immediately prior to use.

The desired improved properties of the systems comprising the chemical compositions in accordance with the invention are based upon a reaction of the epoxide groups with suitable reactants or the epoxide groups with themselves. So in hydraulic binders, e.g. a reaction of the epoxide groups may take place with free hydroxylic groups of the silicate constituents contained therein, in dispersion paints with amino or hydroxy groups of pigments contained therein. It should be noted that the high pH value prevailing generally in hydraulic binders increases the nucleophilia of the mentioned hydroxy and/or amino groups. In the absence of suitable reactants in the application medium, a crosslinking may be obtained by incorporation of crosslinking agents or hardeners. Suitable hardening systems are e.g. di-, tri-, oligo- and polyamines, deprotonated di-, tri- oligo- and polycarboxylic acids and hydroxy-functionalized compounds such as alcohols or silanols. Advantageoulsy also dispersions or powders of amino and/or carboxylic-functionalized polymers may be used. Alkalies, such as sodium hydroxide and potassium hydroxide, alkaline earths such as calcium hydroxide, or acids such as, $H_3PO_4$, $H_2SO_4$, HCl etc. may also be used in order to optimize the pH value, because both a high pH value and a low pH value causes the self-crosslinking of the epoxide groups. Furthermore, transition metal compounds such as AlCl3, SbCl5, FeBr3, FeCl3, SnCl4, TiCl4, ZnCl2, Al(Oi-C3H7)3 and also BF3 or BCl3 may be used. The hardeners could be included into dry mixtures, being delivered as separate components or be added to the above said mixture.

The advantages connected with the invention are manifold. So has the method according to the invention a surprising flexibility as regards the quantitative and qualitative general conditions as opposed to the initially mentioned comparative teachings. It is not required to renounce the use of emulsifiers, and yet the obtained method products show advantageous properties, also as regards the above mentioned film formation. A special advantage resides in the fact that a product is obtained wich leads to chemical systems which exhibit especially valuable properties in the pronounced final applications due to the occurring crosslinking reactions. In case of use of the inventive chemical composition in tile adhesive formulations e.g. both the adhesion of the tile and the cohesion of the mortar are greatly improved. In this respect said crosslinking shows an outspoken improvement wherever high water proofness is to be obtained. The residual monomer contents in the inventive products is about 150 ppm and less, down to the virtually complete exclusion. It is therefore negligeable. Moreover, the inventive products may be used in an extraordinarily high variety of fields of application which are not related to one another.

The invention is subsequently to be explained in further details, which are by no means to be understood as being limitative.

EXAMPLE 1

65 g of polyvinyl alcohol (PVA) having a hydrolysis degree of 88% and a viscosity of 4 mPas (in the form of 4% aqueous solution) dissolved in 570 g water, were placed into a 2 liters glass reactor equipped with a stirrer and a temperature control device. The pH value was adjusted to approximately 7.5 using sodium bicarbonate. That solution was thermostatized on 75° C. 5.3 g of tert-butyl hydroperoxide were added. Subsequently 764 g of monomer mixture consisting of 363 g of styrene, 363 g butyl acrylate and 38 g glycidyl methacrylate were added continuously during 3.5 hours, and parallel thereto 4.5 g sodium formaldehyde sulfoxylate in the form of 10% aqueous solution were dosed into the reactor during 5 hours. Half an hour after the commencement of the monomer addition, 11.5 g PVA (same hydrolysis dergree and same visocosity as above) dissolved in 46 g water was continuously dosed into the reactor. The reaction temperature rose to 80° C. At the end of the monomer dosage 1.5 tert-butylhydroperoxide was added to the reaction mixture. After an overall reaction duration of 5.5 hours, the appearing dispersion was cooled and analysed. The solids amounted to 55.8% the pH value to 7.1, the viscosity was 8.230 mPas (in acc. with Epprecht, beaker D and step 13) and the medium particle size was 0.6 $\mu$m.

EXAMPLE 2

Example 1 was repeated, but the monomer mixture consisted of 382 g styrene and 382 g butylacrylate only. The solids were 56.0%, the pH value was 7.0, the viscosity was 6.320 mPas (according to Epprecht, beaker D and step 13) and the medium particle size was 0.5 μm.

EXAMPLE 3

Example 1 was repeated, but prior to the commencement of the reaction only 34 g PVA dissolved in 570 g water were filled into the reactor. The solids amounted to 55.3%, the pH value was 7.4, the viscosity 1.575 mPas (according to Epprecht, beaker C and step 13) and the medium particle size was 0.7 μm.

EXAMPLE 4

Example 1 was repeated, but prior to the commencement of the reaction, 50 g PVA dissolved in 570 g water were filled into the reactor. In addition, 5.0 g of a mixture of ethoxylated linear fatty alcohols were stirred into the receiver. No PVA solution was added. The solids amounted to 55.6%, the pH value 7.2, the viscosity 2.810 mPas (according to Epprecht, beaker C and step 13) and the medium particle size 0.9 μm.

EXAMPLE 5

Example 1 was repeated, but prior to the commencement of the reaction, 61 g PVA dissolved in 570 g water were filled into the reactor. In addition, 7.6 g of a nonylphenol ethoxylate were stirred into the receiver. The monomer mixture was continuously dosed-in during 2.5 hours, the reaction temperature rising up to 85° C. The sodium formaldehyde sulfoxylate solution was dosed-in for 4 hours. No PVA solution was added. The total duration of the reaction was 4.5 hours. The solids amounted to 55.6%, the pH value 8.0, the viscosity 2.810 mpas (according to Epprecht, beaker C and step 13) and the medium particle size 0.7 μm.

EXAMPLE 6

Example 1 was repeated, but prior to the commencement of the reaction, 38 g PVA dissolved in 525 g water were filled into the reactor. In addition, 3.8 g of a nonylphenol ethoxylate were stirred into the receiver. The monomer mixture was continuously dosed-in during 2.5 hours, the reaction temperature rising up to 85° C. The sodim formaldehyde sulfoxylate solution was dosed-in for 4 hours. With the commencement of the monomer addition, 38 g PVA dissolved in 153 g water were continuously dosed into the reactor parallel to the monomer addition and during 2.5 hours. The total duration of the reaction was 4.5 hours. The solids amounted to 54.0%, the pH value 7.2, the viscosity 3.330 mpas (according to Epprecht, beaker C and step 13) and the medium particle size 1.1 μm.

EXAMPLE 7

Example 5 was repeated, but no nonylphenol ethoxylate was added. The monomer mixture consisting of 363 g styrene and 363 g butylacrylate was continuously dosed-in during 2.5 hours, 38 g glycidylmethacrylate was added to the reaction mixture half an hour after the end of the monomer addition within short time. The solids amounted to 55.9%, the pH value 7.4, the viscosity 7.200 mPas (according to Epprecht, beaker D and step 13) and the medium particle size 1.0 μm.

EXAMPLE 8

Example 7 was repeated, however, instead of PVA the same quantity of polyvinylpyrrolidone (medium molecular weight about 8000 g/mol) was added. The solids amounted to 55.4%, the pH value 7.9, the viscosity 80 mPas (according to Epprecht, beaker B and step 13) and the medium particle size 0.4 μm.

EXAMPLE 9

The dispersions from the examples 1 and 2, called in the following dispersion 1 or dispersion 2 (comparative dispersion) were spray-dried according to the usual method by spraying the dispersions through two-substance-nozzles. Atomizing medium was air, prepressurized to 4 bar; the forming droplets were dried in direct-current line with air of 125° C.

Diespersions 1 and 2 and in water redispersed dispersion powder 1 (obtained from dispersion 1) were subsequently freeze-dried. Subsequently the soluble parts were solved out by means of choroform. A $^{13}$C-NMR (in CDCl3) of the extracts of dispersion 1 and of the dispersion powder 1 showed both carbon atoms of the epoxide ring to be at 48.9 and 44.6 ppm respectively. Such bands were not observed in the extract of dispersion 2 (comparative dispersion). This clearly shows that the epoxide groups are still present both after the polymerization and after the spray-drying.

The obtained dispersion powders 1 and 2 were mixed each with 5 parts quartz sand 0.1–0.3 mm (59.9 parts), Portland cement PZ45 (31.8 parts), calcium hydroxide (2.9 parts) and methyl cellulose having a viscosity of 6,000 mPas (as 20% aqueous solution; 0.4 parts) and mixed with water (22 parts). The thus obtained mortar was applied upon a concrete slab and subsequently stoneware tiles (5×5 cm) were laid into the mortar bed. After 28 days storage in normal climate (23° C. and 50% rel. humidity of air) or 7 days storage in normal climate and 21 days storage in water respectively, the adhesive strengths in accordance with DIN 18'156, part 2, were measured. The this obtained values (table 1) show clearly that mortar systems which contain the inventive dispersion powder increase the adhesive strengths of tiles.

TABLE 1

Adhesive pull strengths after dry and wet storage:

| Mode of storage | Dispersion powder 1 (acc. invention) | Dispersion powder 2 (compared) |
| --- | --- | --- |
| Dry storage | 1.25 N/mm$^2$ | 1.0 N/mm$^2$ |
| Wet storage | 0.85 N/mm$^2$ | 0.7 N/mm$^2$ |

We claim:

1. A chemical composition redispersible in aqueous systems containing a copolymer based on (a) styrene and/or at least one alkyl (meth)acrylate, the amount of styrene and/or alkyl (meth)acrylate being≧50% by weight, based on the total monomers, (b) 0.1 to 50% by weight, based on the total monomers, of units of an epoxide group containing ethylenic unsaturated comonomer, said comonomer containing reactive epoxide groups; with (c) a water-soluble polymeric protective colloid selected from the group consisting of polyvinyl alcohol, polyvinyl pyrrolidone and polyacrylate, wherein 2 to 30 parts by weight of the water-soluble polymeric protective colloid are allotted to 100 parts by weight of the copolymer.

2. Chemical composition according to claim 1, characterized in that the said polyvinyl alcohol has a mean molecular weight of 10,000 to 200,000 and a degree of hydrolysis of 80 to 95%, and the polyvinyl pyrrolidone has a mean molecular weight of 1,000 to 1,000,000.

3. Chemical composition according to claim 1, characterized in that the alkyl (meth)acrylate has an alkyl group of a chain length of 1 to 14 carbon atoms.

4. Chemical composition according to claim 1, characterized in that the alkyl (meth)acrylate is butyl (meth) acrylate, 2-ethyl hexyl (meth)acrylate and/or ethyl (methacrylate.

5. Chemical composition according to claim 1, characterized in that the epoxide group containing ethylenic unsaturated comonomer is an ester or an ether.

6. Chemical composition according to claim 5, characterized in that the ester is a glycidyl (meth)acrylate, and the ether is a glycidyl vinyl ether or a glycidyl allyl ether.

7. Chemical composition according to claim 1, characterized in that the amount of styrene and/or methacrylate is 70 to 80% by weight.

8. Chemical composition according to claim 1, characterized in that the copolymer contains 1 to 25% by weight based on the total monomers, of the epoxide group containing ethylenic unsaturated comonomer.

9. Chemical composition according to claim 1, characterized in that the epoxide functionality of the epoxide-group-containing ethylenic unsaturated comonomer polymerized into the copolymer is preserved over about 30%.

* * * * *